United States Patent
Cotton

(10) Patent No.: US 7,455,067 B1
(45) Date of Patent: Nov. 25, 2008

(54) PORTABLE FOOD TRAY PRE-WASH AND WATER RECYCLING APPARATUS

(76) Inventor: Randall D. Cotton, 5830 Memorial Hwy., No. 1307, Tampa, FL (US) 33615

(*) Notice: Subject to any disclaimer, the term of this patent is extended or adjusted under 35 U.S.C. 154(b) by 483 days.

(21) Appl. No.: 11/332,004

(22) Filed: Jan. 13, 2006

Related U.S. Application Data

(60) Provisional application No. 60/643,480, filed on Jan. 13, 2005.

(51) Int. Cl.
B08B 3/00 (2006.01)
B08B 3/12 (2006.01)
B08B 6/00 (2006.01)

(52) U.S. Cl. .......... 134/83; 134/57 R; 134/62; 134/72; 134/73; 134/104.2; 134/109; 134/199; 134/200; 15/21.1; 15/77; 15/88.3

(58) Field of Classification Search ........... 134/57 R, 134/62, 72, 73, 83, 104.2, 109, 199, 200; 15/21.1, 77, 88.3
See application file for complete search history.

(56) References Cited

U.S. PATENT DOCUMENTS

| | | | |
|---|---|---|---|
| 2,651,065 A | 9/1953 | O'Connor | |
| 2,802,227 A * | 8/1957 | Parsons | 15/93.4 |
| 3,178,745 A | 4/1965 | Kleebauer | |
| 3,223,097 A * | 12/1965 | Spaulding | 134/46 |
| 3,479,222 A * | 11/1969 | David et al. | 134/33 |
| 3,657,758 A * | 4/1972 | Lazar et al. | 15/93.1 |
| 3,938,533 A | 2/1976 | Richard | |
| 3,939,854 A * | 2/1976 | Kitterman et al. | 134/57 R |
| 4,281,675 A | 8/1981 | Pure | |
| 4,420,004 A * | 12/1983 | Jensen | 134/96.1 |
| 4,473,922 A * | 10/1984 | Weihe | 15/309.2 |
| 4,561,903 A * | 12/1985 | Blaul | 134/10 |
| 4,774,737 A * | 10/1988 | Hanson | 15/56 |
| 4,826,539 A * | 5/1989 | Harpold | 134/10 |
| 5,013,367 A * | 5/1991 | Butts | 134/9 |
| 5,581,836 A | 12/1996 | Kleber | |
| 6,164,301 A * | 12/2000 | McFadden et al. | 134/200 |
| 2005/0126592 A1 * | 6/2005 | Publ et al. | 134/18 |

* cited by examiner

Primary Examiner—Michael Barr
Assistant Examiner—Rita R Patel
(74) Attorney, Agent, or Firm—Kenneth A. Roddy

(57) ABSTRACT

A portable food tray pre-wash and water recycling apparatus and method for pre-washing reusable food trays prior to placement in a separate cleaning and sanitizing unit that significantly reduces water wasted in kitchen and scullery areas. The apparatus includes a portable cabinet having a slot in a top end for inserting a food tray, laterally opposed spray nozzles beneath the slot that spray both sides of the tray, laterally opposed rotating brushes beneath the nozzles that scrub the tray, a tray support and brush comb member that supports the tray in a vertical position and removes particles from the brushes, a series of removable incrementally smaller gauge filters vertically spaced beneath the brushes that slide in from one side to filter the water, a water reservoir beneath the filters, a heating unit to heat and disinfect the filtered water, and a pump that recycles heated water back to the nozzles.

12 Claims, 5 Drawing Sheets

PORTABLE FOOD TRAY PRE-WASH AND WATER RECYCLING APPARATUS

CROSS REFERENCE TO RELATED APPLICATION

This application claims priority of U.S. Provisional Application Ser. No. 60/643,480, filed Jan. 13, 2005.

BACKGROUND OF THE INVENTION

1. Field of the Invention

This invention relates generally to food tray cleaning apparatus, and more particularly to a portable food tray pre-wash and water recycling apparatus and method that pre-washes food trays prior to placement in a separate cleaning and sanitizing unit and significantly reduces water wasted in kitchen and scullery areas aboard marine vessels, and in industrial, commercial, and institutional cafeterias.

2. Background Art

The present invention is directed toward an apparatus and method that pre-washes reusable food trays of the type that have compartments or shallow recesses formed in which food is placed, such as those used aboard marine vessels, and in industrial, commercial, and institutional cafeterias, prior to their placement in a separate cleaning and sanitizing unit and recycles the water used in the pre-wash operation. The advantage of reusable compartmented food trays is that the purchasing, stocking, distributing, collecting and washing is reduced to a single item. The main disadvantage is the requirement for washing the trays after each meal, and the amount of water wasted in the cleaning operation.

Typically, in the tray cleaning operation, after dumping the food from the trays, and prior to placing them in a conventional tray washing machine for cleaning and sanitizing, the trays are subjecting to a "scraping stage" where the food refuse is manually scraped from the trays and they are manually sprayed with water by a hand-held water jet nozzle with a squeeze trigger to remove the remaining food debris. The trays are usually manually sprayed for approximately 10 seconds per tray, and approximately 50 oz. of water is utilized with a conventional water jet nozzle. After use, the sprayed water is considered wastewater or "graywater" and is not recycled or reused.

Based on daily feed charts used by cooks aboard a naval frigate, it is estimated that a crew of 200 men will use about 445 trays per day in port (docked), and about 650 trays per day underway (at sea). Thus, in the example of a crew of 200 men, the amount of water used (wasted) daily by the conventional manual spraying method would be about 173.8 gallons per day in port (docked), and about 253.9 gallons per day underway (at sea). The amount of water wasted in this simple operation is significantly greater aboard larger vessels with larger crews, such as an aircraft carrier with a crew of 6,000. The amount of water wasted in this simple operation aboard aircraft carrier with a crew of 6,000 would be about 5,214 gallons per day in port (docked), and about 7,617 gallons per day underway (at sea).

Graywater is defined as the combined effluent wastewaters or drainage from shipboard galleys, sculleries, dishwashers, laundries, showers, sinks, and washbasins. Many ships directly discharge graywater, without treatment, into navigable waters, including lakes and waters near the shoreline. Some ships are equipped with concentration, holding, and transfer tanks for the purpose of storing graywater until it can be pumped to a dockside sanitation system. Graywater discharges in the past have not been subjected to permitting or regulatory requirements; however, as a result of increasingly stringent water quality standards being imposed under state, national, and international regulations, wastewater offload and disposal costs in domestic and foreign ports and harbors continue to increase.

These same problems are also present in industrial, commercial, and institutional cafeterias, that utilize reusable food trays in feeding large numbers of people.

Thus, there remains a need for an effective and economical means to reduce wastewater effluent, particularly graywater discharges from marine vessels, and to significantly reduce water wasted in kitchen and scullery areas in industrial, commercial, and institutional facilities.

There are several patents that are directed toward tray washing apparatus of various constructions, most of which are large, complex, elongate conveyor type apparatus that include a washing compartment and a sterilizing compartment, and associated mechanisms for receiving and transporting the trays through the compartments.

O'Connor, U.S. Pat. No. 2,651,065 discloses a tray washing and sterilizing machine having a slot in a top end of a side wall for inserting a food tray, spray nozzles, and a pair of rotating brushes at an upper end that spray and scrape both sides of the tray, and a removable filter screen (47) beneath the brushes that slides in from one side to filter the water, a water reservoir beneath the filters, a heating unit to heat and disinfect the water, and a pump to pump the heated water to the spray nozzles and to another set of nozzles in an adjacent sterilizing compartment. The trays are fed through the slot and pre-washed and then sterilized in the adjacent sterilizing compartment.

Kleebauer, U.S. Pat. No. 3,178,745 discloses a movable machine for washing plastic shields of fluorescent lights, which has a slot in a top end of a side wall for inserting a flat plastic panel, spray nozzles, and a pair of rotating brushes at an upper end that spray and scrape both sides of the panel, and two water reservoirs beneath the brushes, and a pump to pump recycle the water to the spray nozzles.

Richard, U.S. Pat. No. 3,938,533 discloses an automatic scullery apparatus for automatically processing carrying trays having used culinary items and refuse thereon that collects and cleans reusable culinary items (e.g. knives, forks and spoons), separates and disposes of waste, and cleans the trays without need for operating personnel. In preferred embodiments, the apparatus automatically stacks the cleaned trays and sorts and collects the cleaned reusable culinary items by type so that the trays and the culinary items are readily available for reuse.

Kitterman et al, U.S. Pat. No. 3,939,854 discloses a tray washing system that includes conveyors which transport compartmented food service trays from a tray receiving mechanism to inverting and scraping mechanisms and through washing, rinsing and drying mechanisms to a stacking mechanism. The receiving mechanism restricts trays to insertion in a predetermined orientation in which the food receiving surfaces face upwardly, and the inverting mechanism inverts each tray so that the food receiving surface faces downwardly. As each tray is inverted, the scraping mechanism discharges substantially the entire contents of a cleaning fluid reservoir onto the food receiving surface of the tray, and thereby dislodges refuse and silverware that may be on the tray. The washing, rinsing and drying mechanism apply a water-detergent solution, rinse water, and drying air to the trays, respectively, and the stacking mechanism deposits the trays onto a mobile self-depressing tray receiver. The tray washing system further includes a silverware separating and soaking mechanism comprising a chute which receives cleaning fluid and refuse and silverware entrained therein, a dam which removes the heavier silverware from the cleaning fluid, and a door in the bottom of the chute for dropping the silverware into a soaking sink.

Pure, U.S. Pat. No. 4,281,675 discloses a washing apparatus for washing insulated trays that includes an endless conveyor below the elevation of first and second guide rails that guide the trays in an upright disposition as they are being washed. The conveyor includes generally V-shaped tray supports at spaced points therealong so that each tray is supported by two adjacent tray supports. Vertically disposed manifolds have spraying nozzles for spraying water generally horizontally at opposite major faces of the trays.

Kleber, U.S. Pat. No. 5,581,836 discloses a compact wall-mounted or countertop-supported washing and sanitizing unit for cleaning and drying food service trays as well as other articles after being serially loaded in an upright manner in guide tracks that lead through the unit so that the trays process one at a time through adjacent washing and drying stations of the unit. After being manually loaded, an operator by exerting a displacement force on a last loaded tray urges preceding trays through the unit by virtue of their edge-to-edge physical contact.

The present invention is distinguished over the prior art in general, and these patents in particular by a portable food tray pre-wash and water recycling apparatus and method that pre-washes reusable food trays prior to placement in a separate cleaning and sanitizing unit and significantly reduces water wasted in kitchen and scullery areas aboard marine vessels, and in industrial, commercial, and institutional cafeterias. The apparatus includes a portable cabinet having a slot in a top end for inserting a food tray, laterally opposed spray nozzles beneath the slot that spray both sides of the tray, laterally opposed rotating brushes beneath the nozzles that scrub the tray, a tray support and brush comb member that supports the tray in a vertical position and removes particles from the brushes, a series of removable incrementally smaller gauge filter members vertically spaced beneath the brushes that slide in from one side to filter the water, a water collection reservoir beneath the filters, a heating unit to heat and disinfect the collected filtered water, and a pump to recycle the heated water back to the spray nozzles.

SUMMARY OF THE INVENTION

It is therefore an object of the present invention to provide a portable food tray pre-wash and water recycling apparatus and method that pre-washes food trays prior to placement in a separate cleaning and sanitizing unit which will significantly reduce water wasted in kitchen and scullery areas aboard marine vessels, and in industrial, commercial, and institutional cafeterias.

It is another object of this invention to provide a portable food tray pre-wash and water recycling apparatus that method that conserves water by recycling water used in tray cleaning operations that would otherwise be classified as wastewater or graywater.

Another object of this invention is to provide a portable food tray pre-wash and water recycling apparatus that utilizes a series of vertically spaced incrementally sized filter members that filter the water, which are easily accessible and removable for installation and cleaning.

Another object of this invention is to provide a portable food tray pre-wash and water recycling apparatus that utilizes rotating brushes wherein food particles and residue are automatically removed from the brushes during rotation.

Another object of this invention is to provide a portable food tray pre-wash and water recycling apparatus that is self-contained in a relatively small cabinet and does not require complex, elongate conveyor apparatus for receiving and transporting the trays or multiple washing and sterilizing compartments.

A further object of this invention is to provide a portable food tray pre-wash and water recycling apparatus that is used as an adjunct to existing conventional tray washing and sterilizing apparatus.

A still further object of this invention is to provide a portable food tray pre-wash and water recycling apparatus that is simple in construction, inexpensive to manufacture and rugged and reliable in operation.

Other objects of the invention will become apparent from time to time throughout the specification and claims as hereinafter related.

The above noted objects and other objects of the invention are accomplished by a portable food tray pre-wash and water recycling apparatus and method that pre-washes reusable food trays prior to placement in a separate cleaning and sanitizing unit and significantly reduces water wasted in kitchen and scullery areas aboard marine vessels, and in industrial, commercial, and institutional cafeterias. The apparatus includes a portable cabinet having a slot in a top end for inserting a food tray, laterally opposed spray nozzles beneath the slot that spray both sides of the tray, laterally opposed rotating brushes beneath the nozzles that scrub the tray, a tray support and brush comb member that supports the tray in a vertical position and removes particles from the brushes, a series of removable incrementally small gauge filter members vertically spaced beneath the brushes that slide in from one side to filter the water, a water collection reservoir beneath the filters, a heating unit to heat and disinfect the collected filtered water, and a pump to recycle the heated water back to the spray nozzles.

DESCRIPTION OF THE PREFERRED EMBODIMENT

Figure 1:
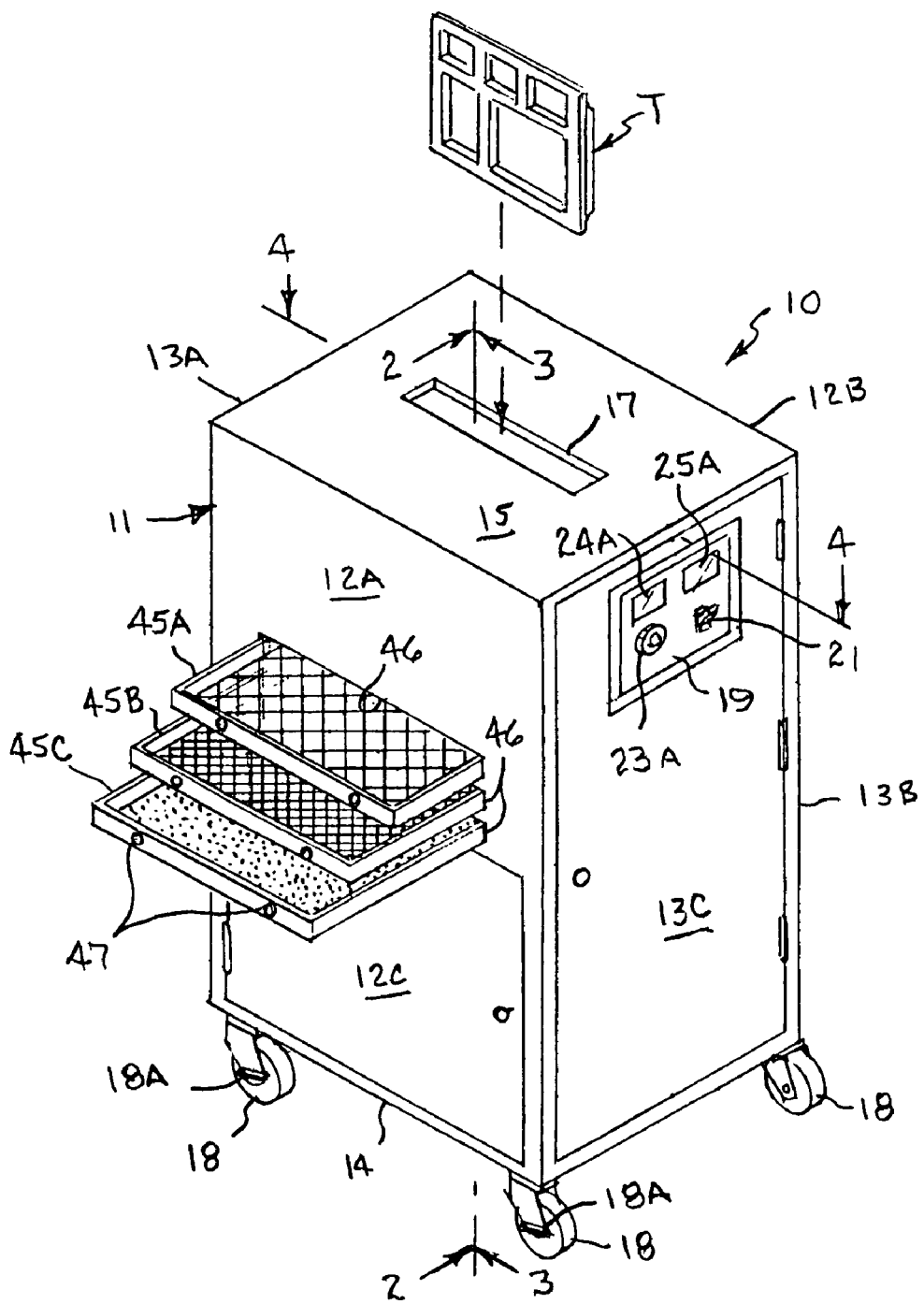
FIG. 1 is a perspective view of the portable food tray pre-wash and water recycling apparatus in accordance with the present invention.

Referring to the drawings by numerals of reference, there is shown in FIGS. 1-4, a preferred a portable food tray pre-wash and water recycling apparatus 10 that pre-washes reusable food trays of the type in which food is placed, prior to their placement in a separate cleaning and sanitizing unit and recycles the water used in the pre-wash operation. Typically, these types of trays T are of a rectangular shape approximately 14"×11"×1" and have shallow recessed compartments for holding various food items.

The portable food tray pre-wash and water recycling apparatus 10 includes a generally rectangular housing or cabinet 11 having side walls 12A and 12B, end walls 13A and 13B, a bottom wall 14, and a top wall 15. Access doors 12C and 13C may be provided on the side wall 12A and end wall 13B, respectively, or both end walls. Interior walls 16A and 16B spaced a short distance inwardly from, and parallel to, the end walls 13A and 13B extend vertically between the top and bottom walls 15 and 14 and transversely between the side walls 12A and 12B.

The top wall 15 is provided with a longitudinal horizontal slot 17 communicating with the interior of the cabinet 11, which is sized to allow manual insertion of a tray T inserted vertically downward therethrough from one end or side. In a preferred embodiment, the cabinet 11 is approximately 24" wide, 28" deep, and 48" tall, and is supported on caster type wheels 18 for portability and transporting it to a desired location, and each wheel is provided with a wheel lock 18A to prevent it from moving after being positioned at the desired location.

Figure 2:
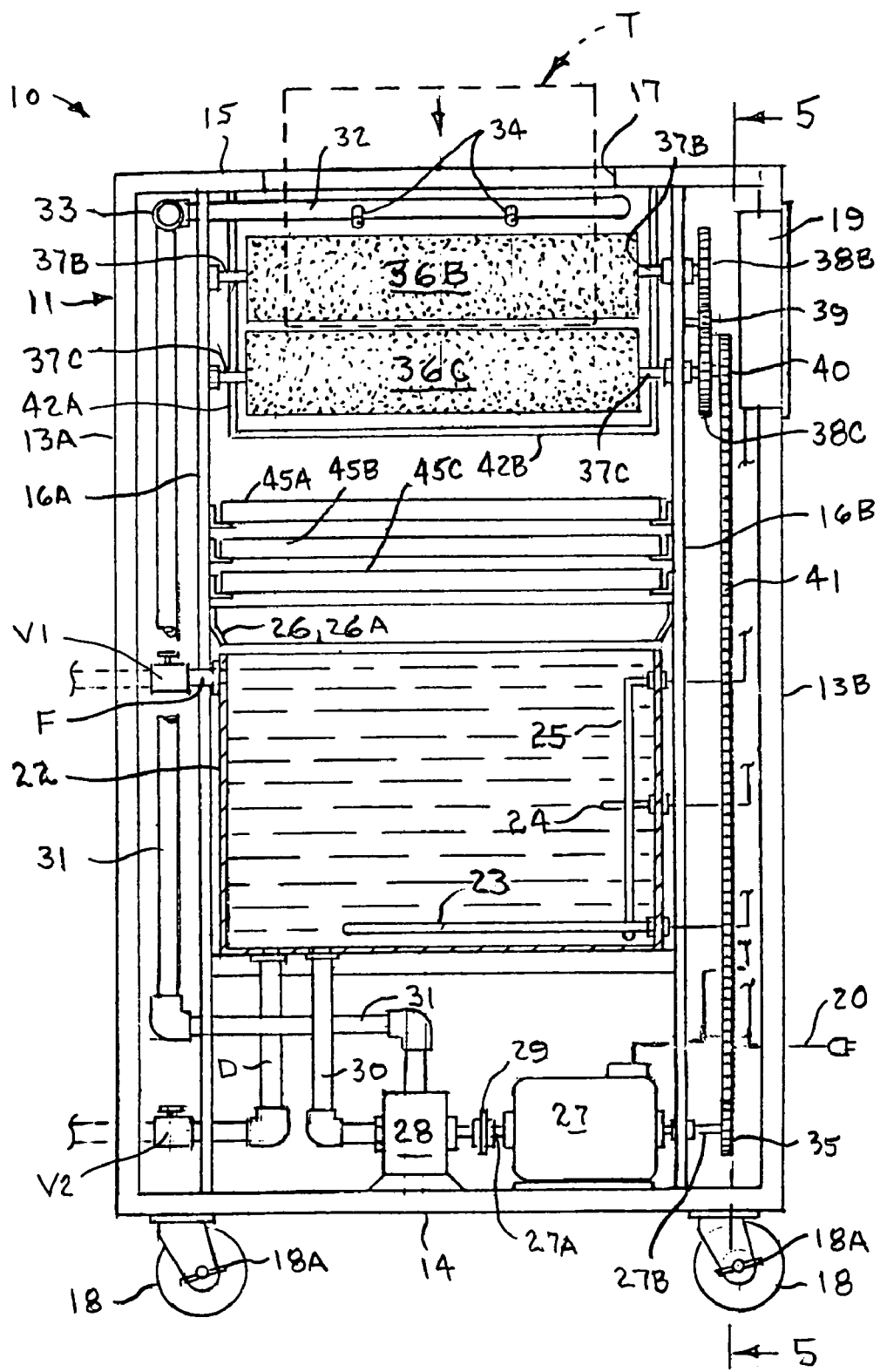
FIG. 2 is a cross sectional view of the portable food tray pre-wash and water recycling apparatus taken along line 2-2 of FIG. 1.

As shown schematically in FIG. 2, a control panel 19 is mounted in the door 13C of the end wall 13B, or other suitable location, and houses the electrical circuitry for operating the apparatus 10. Electrical power is supplied to the apparatus through a power cord 20 connected with the electrical circuitry in the control panel 19 and controlled by an on-off switch 21 on the control panel.

A water reservoir 22 is mounted in the lower portion of the cabinet 11. In a preferred embodiment, the reservoir 22 is sized to contain a volume of 25 gallons of water. An electric heating element 23 is mounted in lower portion of the reservoir and is connected with power source through the electrical circuitry in the control panel 19 and is controlled by a temperature control knob 23A mounted on the control panel. A thermometer or water temperature sensor 24 is mounted in mid portion of the reservoir 21 and is connected through the electrical circuitry with a temperature gauge or display 24A on the control panel 19. A water level sensor 25 is mounted in the reservoir 21 and is connected through the electrical circuitry with a water level gauge or display 25A on the control panel 19.

A generally rectangular duct 26 having inwardly tapered side walls 26A is mounted in the cabinet 11 above the reservoir 22 to channel return water into the top end of the reservoir (as described hereinafter).

A reservoir fill conduit F connected in fluid communication with the interior of the reservoir 22 extends through the interior wall 16A and has a valve V1 at its outer end for connection to a hose for filling the reservoir with water. A reservoir drain conduit D connected in fluid communication with the interior of the reservoir 22 extends through the interior wall 16A and has a valve V2 at its outer end for connection to a hose for draining water from the reservoir.

Figure 3:
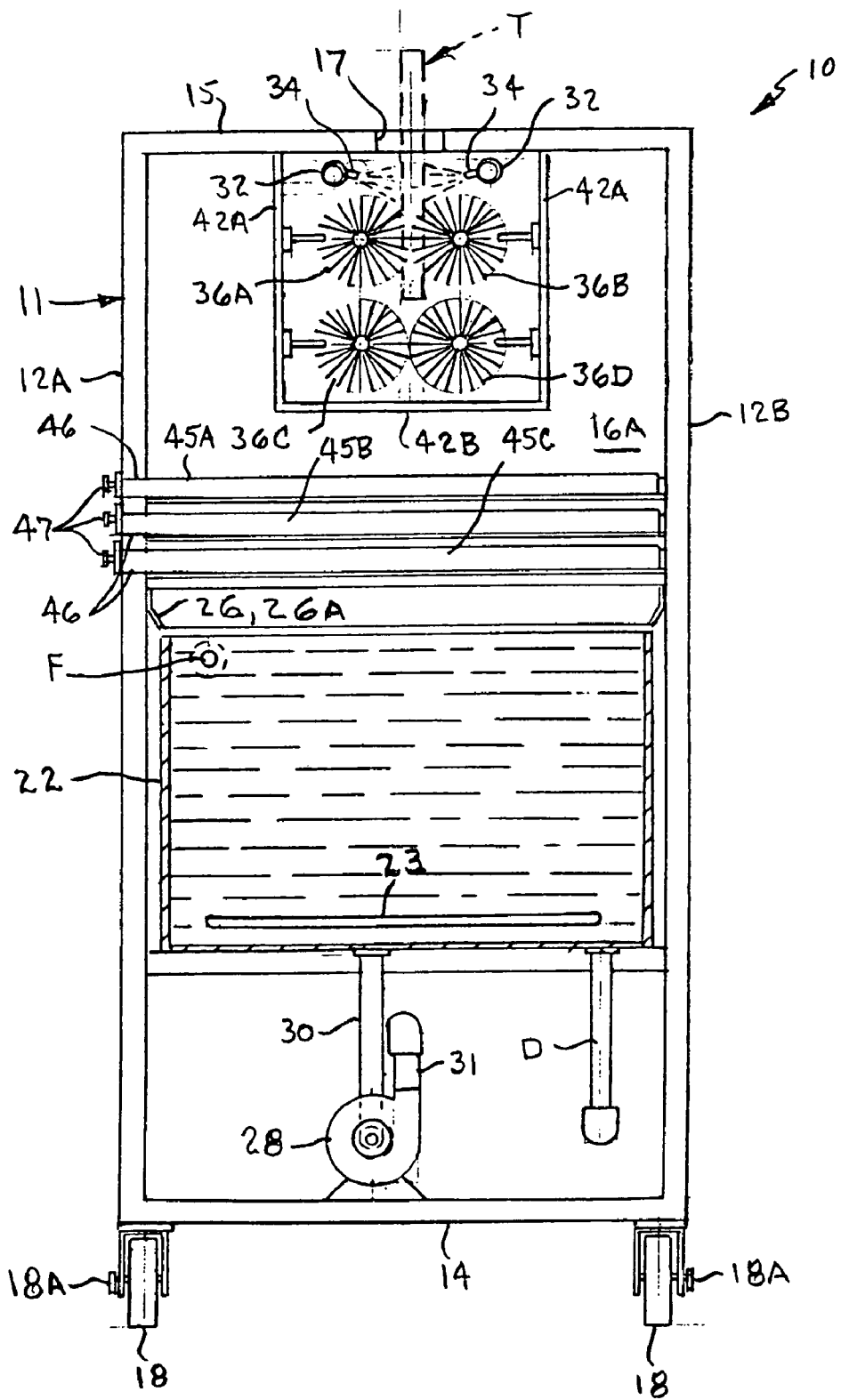
FIG. 3 is a cross sectional view of the portable food tray pre-wash and water recycling apparatus taken along line 3-3 of FIG. 1.
Figure 4:
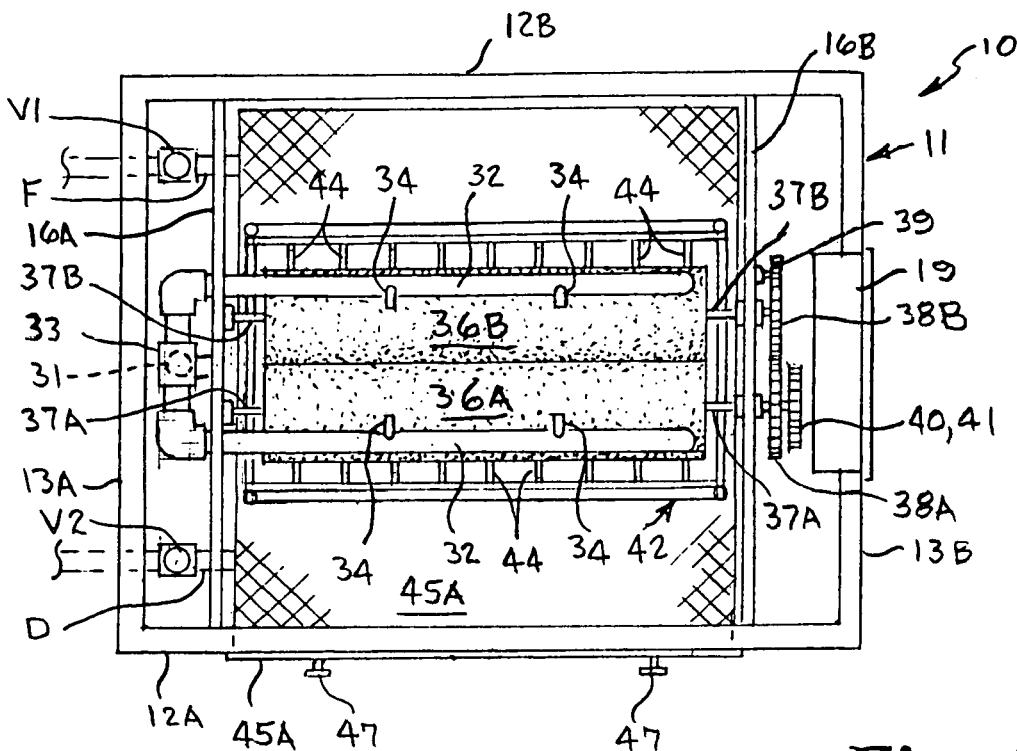
FIG. 4 is a cross sectional top view of the portable food tray pre-wash and water recycling apparatus taken along line 4-4 of FIG. 1.

An electric motor 27 is mounted in the cabinet 11 on the bottom wall 14 beneath the reservoir 22 and has a shaft 27A connected to a water pump 28 through a conventional coupling 29. The intake of the water pump 28 is connected to the interior of the reservoir 22 by a conduit 30, and its outlet is connected to a water supply conduit 31. As best seen in FIGS. 2, 3 and 4, the water supply conduit 31 extends through the interior wall 16A and vertically upward and is adjoined to a pair of laterally spaced conduits 32 by a tee 33. The laterally spaced conduits 32 extend through the interior wall 16A and are disposed horizontally at the upper end of the cabinet 11 just below the slot 17 in the top wall 15 in opposed relation at opposite sides of the slot, and are joined in fluid communication with the water pump 28 by the conduit 31.

The laterally spaced conduits 32 have spray nozzles 34 mounted along their length in opposed relation, at opposite sides of the slot 17, respectively, which are joined in fluid communication therewith. The spray nozzles 34 are positioned to direct opposed high pressure water sprays angularly downward against the respective top and bottom surfaces of a tray T inserted vertically through the slot 17 from one end or side (as indicated in dashed line), and prevent water from escaping from the cabinet 11 through the slot.

Referring again to FIG. 2, the electric motor 27 has a second shaft 27B on the side opposite the water pump 28 that extends through an aperture in the interior wall 16B and has a drive sprocket 35 at its outer end.

An upper pair of roller brushes 36A and 36B are rotatably mounted in the upper end of the cabinet 11 just below the laterally spaced conduits 32 and spray nozzles 34 in horizontally opposed relation, and are spaced apart a sufficient distance such that their bristles will engage and scrub the respective top and bottom surfaces of the tray T inserted vertically through the slot 17. A lower pair of horizontally opposed roller brushes 36C and 36D are rotatably mounted in the upper end of the cabinet 11 a short distance vertically below the upper pair of brushes, and are also spaced apart a sufficient distance such that their bristles will engage and scrub the respective top and bottom surfaces of the tray T inserted vertically through the slot 17.

Figure 5:
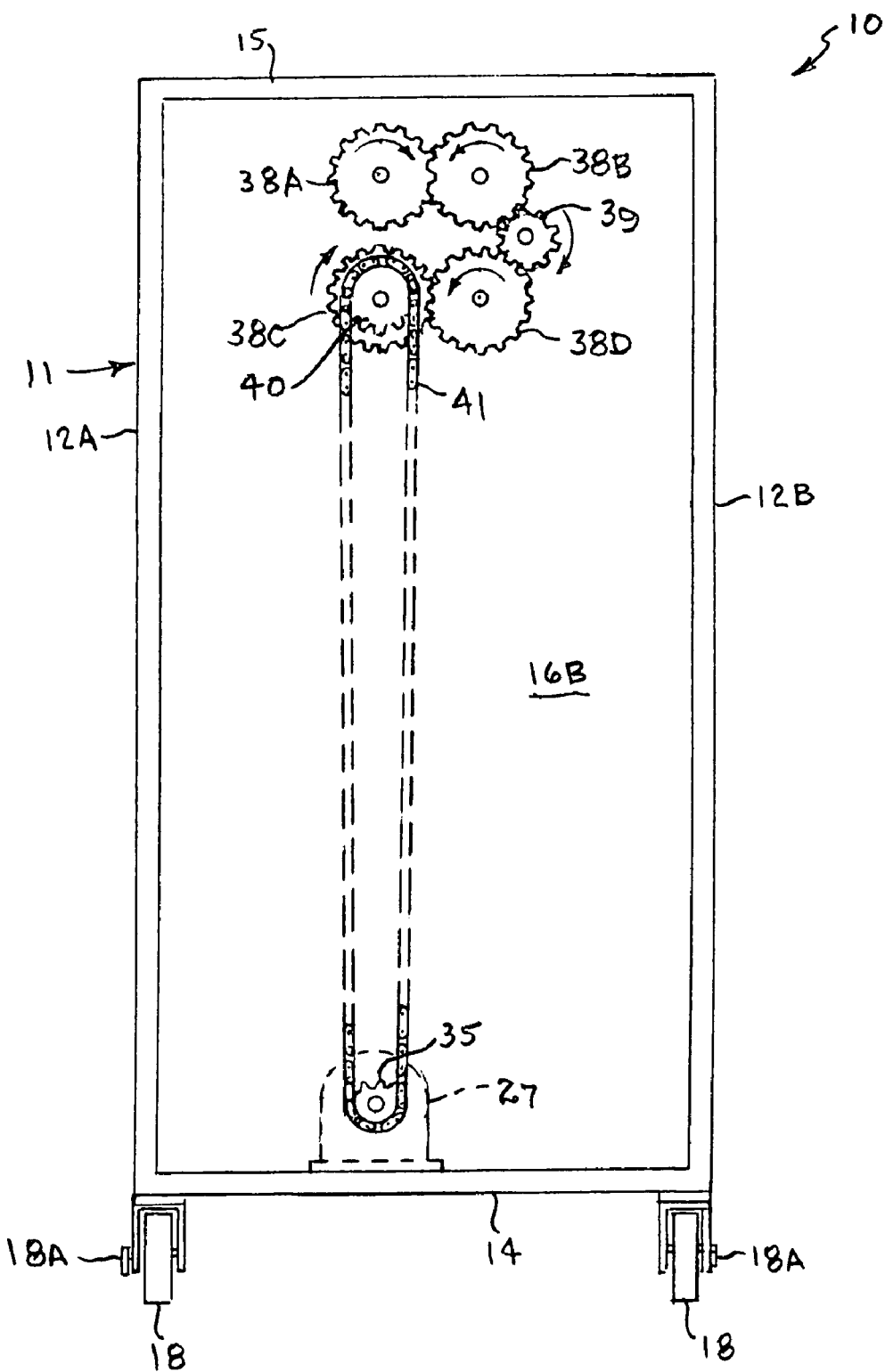
FIG. 5 is a cross sectional view of the portable food tray pre-wash and water recycling apparatus taken along line 5-5 of FIG. 2, showing the chain and sprocket and meshed gear drive arrangement of the roller brushes.

As best seen in FIGS. 2, 4 and 5, the shafts 37A, 37B, 37C and 37D of the brushes 36A, 36B, 36C and 36D are journalled at one end in the interior wall 16A and their other end extends through an aperture in the interior wall 16B and have gears 38A, 38B, 38C and 38D mounted thereon, respectively. The teeth of the upper pair of gears 38A and 38B are engaged with each other and the teeth of the lower pair of gears 38C and 38D are engaged with each other such that they rotate in opposed direction, as shown by the arrows in FIG. 5. The teeth of one upper gear 38B and the teeth of one lower gear 38D are both engaged with an idler gear 39 rotatably mounted on the interior wall 16B. A sprocket 40 is secured to the lower gear 38C and is connected by an endless chain 41 to the drive sprocket 35 of the electric motor 27. In operation, both the upper pair and lower pair of roller brushes 36A, 36B and 36C, 36D rotate in opposite directions toward the center of the cabinet so as to direct food residue and particles dislodged from the surfaces of the tray vertically downward.

Figure 6:
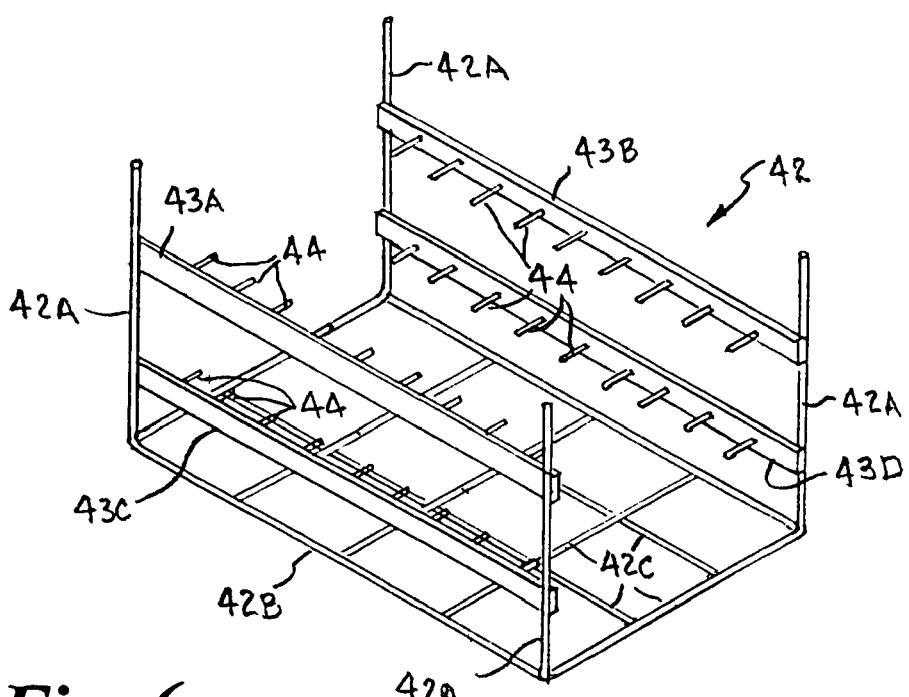
FIG. 6 is an isometric view of the comb and tray support member of the portable food tray pre-wash and water recycling apparatus.

Referring now additionally to FIG. 6, an elongate comb and tray support member 42 is mounted in the cabinet 11 at its upper end. The comb and tray support member 42 is a generally rectangular wire frame having four vertical legs 42A and a bottom portion 42B with parallel spaced longitudinal and transverse cross members 42C disposed beneath the lower pair of roller brushes 36C and 36D. A pair of vertically spaced upper and lower comb members 43A, 43B and 43C, 43D extend horizontally between vertical legs 42A on the opposed longitudinal sides of the comb and tray support member 42 and each has a row of longitudinally spaced apart teeth or fingers 44 of sufficient length to engage the bristles of the respective roller brush during rotation to dislodge food residue and particles from the brush bristles.

The bottom portion 42B of the comb and tray support member 42 is disposed a distance vertically below the top of the cabinet 11 such that the cross members 42C engage and support the lower end or side of the tray T inserted vertically through the slot 17 in the top end of the cabinet.

A series of generally rectangular filters 45A, 45B and 45C are slidably mounted horizontally in vertically spaced relation in the cabinet 11 between the bottom of the comb and tray support member 42 and the water reservoir 22. The horizontal filters 45A, 45B and 45C are similar to a cabinet drawer and are slidably received through respective vertically spaced horizontal slots 46 in the side wall 12A of the cabinet 11. Suitable seals are provided between the filters and the slots to form a watertight seal when the filters are in their fully retracted position in the cabinet. The outer end walls of the filters 45A, 45B and 45C may be provided with a handle or knobs 47 for easily removing the filter screens when it becomes necessary for cleaning.

Each of the filters 45A, 45B and 45C is of a progressively smaller gauge size with the largest at the top 45A and the smallest 45C at the bottom. The uppermost or first filter 45A is of a gauge sufficient to restrict passage of larger food items, such as bones, fruit cores, and peelings, and may be a screen. The intermediate filter 45B is of a gauge sufficient to restrict passage of smaller food particles, such as rice, crumbs, and kernels of corn and may also be a screen. The lowermost filter 45C is of a very fine gauge that filters the water before it passes into the reservoir 22. It should be understood that the lowermost filter 45C may be formed of a fibrous material rather than a screen.

OPERATION

After manually dumping the uneaten food from the trays and scraping the food refuse from the trays into a garbage container, the trays are usually stacked at a location close to the existing conventional food tray washing and sanitizing machine. In a typical tray cleaning operation, the reservoir of the portable food tray pre-wash and water recycling apparatus is initially filled with water and placed at a location near the stacked trays and the existing conventional food tray washing and sanitizing machine. The heater is turned on and set to heat the water to a desired temperature. The temperature setting may be determined by the type of food being served.

After reaching the desired water temperature, the motor is turned on to operate the pump and rotate the brushes while the pumped water is sprayed through the nozzles. The operator then takes a tray from the stack and manually inserts it generally vertically into the slot in the top wall of the cabinet such that it is received and supported on the brush comb and tray support member. As the tray is inserted downwardly through the slot, hot water sprayed from the nozzles is directed onto opposed sides of the tray simultaneously, and as it continues downwardly it passes through the bristles of the counter-rotating laterally opposed brushes, which scrub the opposed sides of the tray simultaneously. The tray is left in its vertically supported position for approximately 3 seconds, and then removed. The fingers of the brush comb and tray support member dislodge particles from said brushes as they rotate.

The sprayed water passes through the series of progressively smaller gauge size filters and is captured in the reservoir and recycled back through the nozzles. The uppermost filter restricts passage of larger food items, such as bones, fruit cores, and peelings; the intermediate filter restricts passage of smaller food particles, such as rice, crumbs, and kernels of corn; and the lowermost filter filters the water before it passes into the reservoir. It should be understood that the filters may be easily inspected and removed as necessary.

The pre-washed trays are stacked and are then ready to be placed in the existing conventional food tray washing and sanitizing machine. The pre-washing operation prevents food refuse and debris from being introduced in to the existing conventional food tray washing and sanitizing machine.

In a preferred embodiment, the reservoir contains a volume of 25 gallons of water, which, as an example, is adequate to service a naval frigate having a crew of 200 men, which would use about 445 trays per day in port (docked), and about 650 trays per day underway (at sea).

In this example the reservoir of the present portable food tray pre-wash and water recycling apparatus would not require draining until after the third meal of the day. Thus, in the example of a crew of 200 men, the amount of water saved by the present pre-washing method is estimated to be about 148.8 gallons per day or 4464 gallons per month in port (docked), and about 228.9 gallons per day or 6867 gallons per month underway (at sea).

While this invention has been described fully and completely with special emphasis upon preferred embodiments, it should be understood that within the scope of the appended claims the invention may be practiced otherwise than as specifically described herein.

The invention claimed is:

1. A portable food tray pre-wash and water recycling apparatus for use in kitchen and scullery areas aboard marine vessels, and in industrial, commercial, and institutional cafeterias for pre-washing reusable food trays prior to placement in a separate cleaning and sanitizing unit, comprising:
    a portable cabinet having side walls, end walls, a bottom wall, and a top wall;
    a slot in said top wall for receiving a food tray inserted generally vertically into said cabinet;
    a water reservoir in said cabinet including heater means for heating water therein, water temperature sensor means for sensing the temperature of water therein, water level sensor means for sensing the level of water therein, and drain means for draining water therefrom;
    pump means including a motor and having an intake connected in fluid communication with said water reservoir for receiving water therefrom, and a discharge outlet for discharging water under pressure;
    at least one pair of spray nozzles connected with said pump means discharge outlet and disposed beneath said slot in laterally opposed relation to spray opposed sides of the tray simultaneously;
    at least one pair of laterally opposed brushes rotatably disposed beneath said spray nozzles and each having a shaft connected with said motor to be rotated thereby and spaced apart a sufficient distance such that their bristles will engage and scrub opposed sides of the tray simultaneously upon rotation,
    tray support means disposed adjacent to said brushes to support the tray in a vertical position;
    a series of filter members removably received in said cabinet in horizontal vertically spaced relation between said brushes and said reservoir, each having filtering surfaces of a different gauge or porosity and arranged in incrementally decreasing gauge or porosity from the uppermost to the lowermost; wherein
    water in said reservoir is heated and pumped therefrom through said spray nozzles while said brushes are rotated to clean opposed sides of the supported tray simultaneously and thereafter passes through said filter members and back into said reservoir.

2. The portable food tray pre-wash and water recycling apparatus according to claim 1, further comprising:

wheels rotatably adjoined to said cabinet bottom wall, each provided with wheel locking means to prevent said cabinet from moving after being positioned at a desired location.

3. The portable food tray pre-wash and water recycling apparatus according to claim 1, further comprising:

a control panel mounted on said cabinet including electrical circuitry connected with said heater means, said water temperature sensor means, said water level sensor means, said pump means motor, and said brushes for controlling the operation thereof, and a power supply cord connected with said electrical circuitry through switch means for supplying electrical power thereto.

4. The portable food tray pre-wash and water recycling apparatus according to claim 3, further comprising:

temperature display means on said control panel connected with said water temperature sensor means for displaying the temperature of water in said reservoir; and water level display means on said control panel connected with said water level sensor means for displaying the level of water in said reservoir.

5. The portable food tray pre-wash and water recycling apparatus according to claim 1, further comprising:

brush comb means associated with said tray support means including finger elements engaged with each of said brushes to dislodge particles from said brushes as they rotate.

6. The portable food tray pre-wash and water recycling apparatus according to claim 5, wherein said tray support means and said brush comb means is an elongate generally rectangular comb and tray support member comprising a wire frame having four vertical legs and a bottom portion with parallel spaced longitudinal and transverse cross members disposed beneath said pair of brushes, and a pair of comb members extending horizontally between said vertical legs on opposed longitudinal sides of said frame, each having a row of longitudinally spaced apart fingers of sufficient length to engage the bristles of a respective said brush during rotation to dislodge food residue and particles from the brush bristles.

7. The portable food tray pre-wash and water recycling apparatus according to claim 1, wherein said series of filters comprise a series of generally rectangular filters slidably mounted horizontally in vertically spaced relation said cabinet, an uppermost one of said filters being of a gauge or porosity sufficient to restrict passage of larger food items, an intermediate one of said filters being of a gauge or porosity sufficient to restrict passage of smaller food particles, and a lowermost one of said filters being of a gauge or porosity sufficient to filter the water passing therethrough before it passes into said reservoir.

8. The portable food tray pre-wash and water recycling apparatus according to claim 1, further comprising:

a first interior wall disposed within said cabinet extending vertically between said cabinet top and bottom walls and transversely between said cabinet side walls, and spaced a distance inwardly from, and parallel to, a first one of said cabinet end walls defining a first compartment therebetween; and a second interior wall disposed within said cabinet extending vertically between said cabinet top and bottom walls and transversely between said cabinet side walls, and spaced a distance inwardly from, and parallel to, a second one of said cabinet end walls defining a second compartment therebetween.

9. The portable food tray pre-wash and water recycling apparatus according to claim 8, wherein said pump means motor has a first shaft coupled to said pump means;

said pump means intake is connected in fluid communication with the interior of said reservoir through a first conduit for conducting water therefrom, and said discharge outlet is connected in fluid communication with said spray nozzles through a water supply conduit for supplying water under pressure thereto.

10. The portable food tray pre-wash and water recycling apparatus according to claim 9, wherein said water supply conduit extends through said first interior wall and vertically upward through said first compartment and is adjoined by a tee to a pair of laterally spaced conduits that extend through said first interior wall and are disposed horizontally at an upper end of said cabinet adjacent to said slot in said cabinet top wall in opposed relation at opposite sides thereof; and said spray nozzles are mounted in fluid communication along the length of said laterally spaced conduits in opposed relation at opposite sides of said slot, respectively, to direct opposed high pressure water sprays angularly downward against respective opposed side surfaces of a tray inserted vertically through said slot.

11. The portable food tray pre-wash and water recycling apparatus according to claim 8, wherein said pump means motor has a second shaft extending through said second interior wall with a drive sprocket connected at its outer end, said drive sprocket disposed in said second compartment;

said at least one pair of a pair of laterally opposed brushes rotatably disposed beneath said spray nozzles, each brush mounted on a respective shaft having one end journalled to said first interior wall and a second end extending through said second interior wall with a gear mounted thereon, the gears disposed in said second compartment and the teeth of said gears engaged with each other and with a sprocket gear; and said sprocket gear connected by an endless chain to said drive sprocket at said outer end of said pump means motor second shaft; and in operation said pair of brushes rotate in opposite directions toward the center of said cabinet so as to direct food residue and particles dislodged from the surfaces of the tray vertically downward.

12. The portable food tray pre-wash and water recycling apparatus according to claim 8, wherein said pump means motor has a second shaft extending through said second interior wall with a drive sprocket connected at its outer end, said drive sprocket disposed in said second compartment;

said at least one pair of brushes comprise a first pair of laterally opposed brushes rotatably disposed beneath said spray nozzles, and a second pair of laterally opposed brushes rotatably disposed beneath said first pair of brushes, each brush mounted on a respective shaft having one end journalled to said first interior wall and a second end extending through said second interior wall with a gear mounted thereon, the gears disposed in said second compartment;

the gears of said first pair of brushes engaged with each other and with an idler gear, and the gears of said second pair of brushes engaged with each other, which said idler gear, and with a sprocket gear;

said sprocket gear connected by an endless chain to said drive sprocket at said outer end of said pump means motor second shaft; and in operation both said first pair of brushes and said second pair of brushes rotate in opposite directions, respectively, toward the center of said cabinet, to direct food residue and particles dislodged from the surfaces of the tray vertically downward.

* * * * *